United States Patent [19]

Stupak

[11] 4,012,965

[45] Mar. 22, 1977

[54] GOVERNOR OR SIMILAR AUTO SPEED CONTROL

[76] Inventor: Adam E. Stupak, 3117 Detroit Ave., Cleveland, Ohio 44113

[22] Filed: May 7, 1975

[21] Appl. No.: 575,186

[52] U.S. Cl. .................. 74/513; 74/526; 92/13

[51] Int. Cl.² ........................... G05G 1/14

[58] Field of Search ........... 74/513, 526, 522, 482; 92/13

[56] References Cited
UNITED STATES PATENTS

| | | | |
|---|---|---|---|
| 1,493,414 | 5/1924 | Anderson | 74/526 UX |
| 2,207,435 | 7/1940 | Jones | 74/513 |
| 2,349,742 | 5/1944 | Macavoy | 74/526 |
| 2,803,971 | 8/1957 | Turner | 74/526 |
| 3,559,537 | 2/1971 | Faure | 92/13 |

*Primary Examiner*—Edgar W. Geoghegan
*Attorney, Agent, or Firm*—Oldham & Oldham Co.

[57] ABSTRACT

A governor or similar feed control device for association with a gas feed, foot control pedal and including a frame means for engaging the foot pedal and being secured thereto, and a foot member adjustably depending from the foot pedal a variable distance to contact the floorboard of the vehicle and curtail depression of the gas feed pedal.

3 Claims, 4 Drawing Figures

GOVERNOR OR SIMILAR AUTO SPEED CONTROL

At the present time, there is an appreciable need to control the consumption of gasoline and equivalent fuel in vehicles, and the speeds at which vehicles operate have been curtailed. It is a well known fact that the efficiency of combustion of fuels and the mileage per gallon increases with uniform supply of fuel to the engine and with no excessive vehicle speeds being permitted.

While a number of devices have been provided heretofore for governing the speed of vehicles or controlling the speed of the vehicles, still most of these devices as available heretofore have been expensive, or they have been difficult to install in the vehicles, or they may have been relatively complex and difficult to maintain in operative condition. Typical governors of a relatively uncomplicated mechanical type have been shown in prior U.S. Pat. Nos. 2,207,435; 2,895,346 and 2,924,117.

OBJECTS OF THE INVENTION

It is the general object of the present invention to provide a mechanical governor for a vehicle which operates through a connection with the manually operated foot pedal that controls motor speed and operation of a vehicle.

Another object of the invention is to provide a simple clamp on easily adjusted speed control device for engaging a fuel feed pedal and limiting its movement with relation to the floorboard on which the foot pedal is positioned.

Yet another object of the invention is to provide a relatively inexpensive, uncomplicated type of a mechanical governor that can be readily attached to the manually operated foot pedals of vehicles for limiting the fuel input to the motor of the vehicle and, hence, curtailing or governing the speed of operation thereof to prevent excessive vehicular speeds and efficient consumption of the fuel used by the vehicle.

The foregoing and other objects and advantages of the invention will be made more apparent as the specification proceeds.

In order to understand the present invention, reference is made to the accompanying drawings, wherein.

When referring to corresponding members shown in the drawings and described in the specification, corresponding numerals are used to facilitate comparison therebetween.

SUBJECT MATTER OF THE INVENTION

Figure 1:
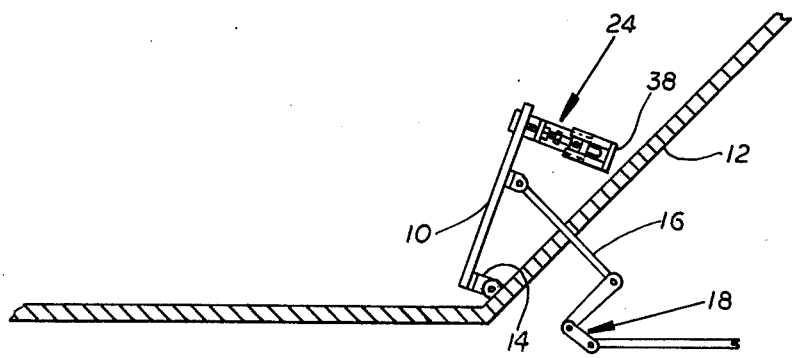
FIG. 1 is a side view of a manually operated foot pedal having a feed control device of the invention operatively connected thereto.
Figures 2, 3, 4:
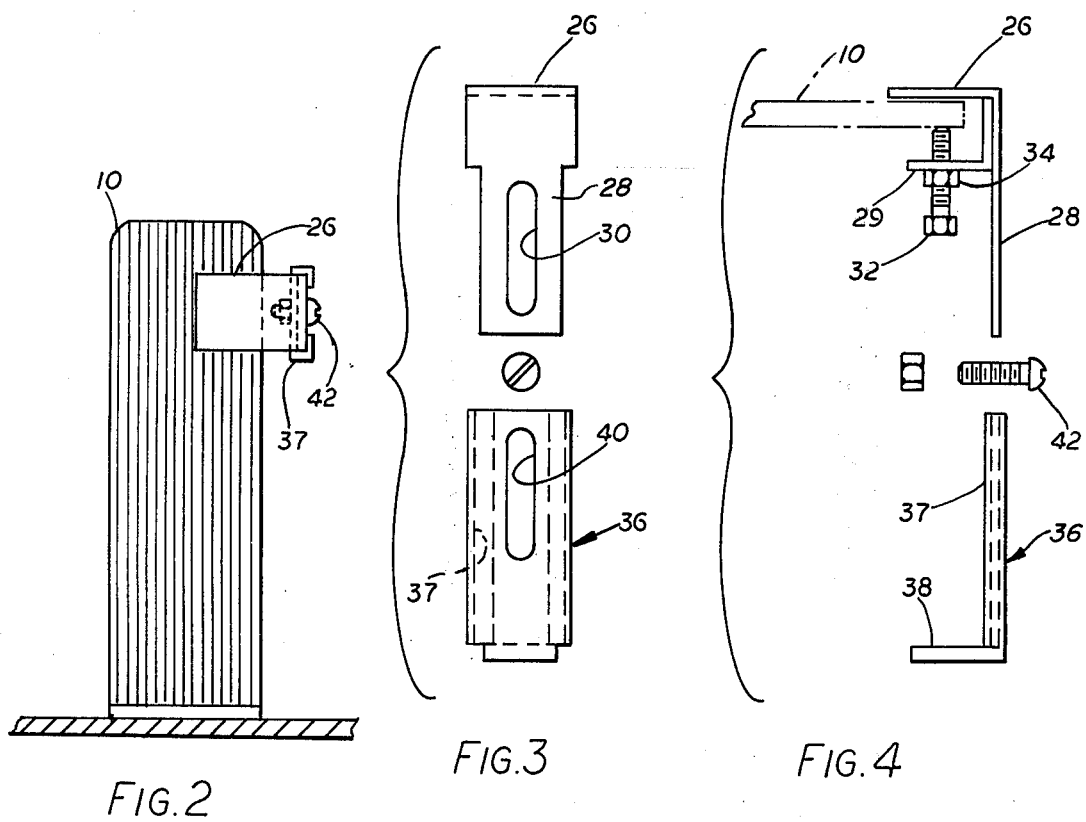
FIG. 2 is a plan view of the foot pedal and associated means of FIG. 1.
FIG. 3 is an exploded elevation of the feed control means of FIG. 1.
FIG. 4 is a side view of the means of FIG. 3.

This invention, as one embodiment thereof, relates to a governor mechanism for use with a gas feed foot control pedal and comprising a frame means for engagement with the foot pedal, a clamp means to secure the frame means to the foot pedal, and a foot member adjustably secured to the frame means to depend therefrom a variable distance for contacting the vehicle floorboard and limit depression of the foot pedal and consequent feed of gasoline to the vehicle motor.

Having reference now to the details of the structures shown in the accompanying drawings, a conventional accelerator or foot pedal 10 is shown pivotally positioned on a vehicle floorboard 12 by conventional hinge means 14. The foot pedal 10 controls a rod or link 16 that is operatively coupled to other link means 18 that operatively connect to a throttle of the vehicle carburetor (not shown).

By the present invention, a governor or equivalent speed control device indicated as a whole by the numeral 24 is provided for operative engagement with the foot pedal 10 to limit the downward movement thereof and consequently control depression of the foot pedal and maximum supply of fuel to the vehicle engine to limit the operative speed thereof. This governor device of the invention includes a frame means 26 for engagement with the foot pedal and which frame means is operatively of generally U-shape in section, but it has a leg 28 depending therefrom when the governor is operatively positioned on a foot pedal. This leg 28 has a longitudinally extending slot 30 formed therein. The frame includes an angle 29 suitably secured thereto to extend in under the foot pedal.

The governor device further includes a suitable clamp means which, in this instance, comprises a set screw 32 which engages a threaded aperture provided in the one leg of the angle 29 of the frame means 26 and protrudes therefrom to clamp against the surface of the foot pedal 10 as indicated in the drawings. The screw 32 preferably has a locknut 34 thereon whereby the screw 32 would effectively clamp the governor device operatively to the foot pedal in a releasable manner.

Control over the governor action of the governor device 24 is provided by means of a foot member of control means 36 which is a relatively short metal bar or plate, usually having a foot section 38 thereon and overhanging lateral flanges 37. The foot member has a longitudinally extending slot 40 therein. The foot member 38 is adapted to be slid onto and superimposed on the leg 28 of the frame means and engage it between the flanges 37. A lock device, such as a screw 42, is inserted through the slots 30 and 40 which are aligned when the leg and foot member are superimposed. Thus, the control means 36 can be moved axially with relation to the leg 28 and control the operative length of the control means 36 that depends from the foot pedal 10. The screw 42 is used to secure the control means in desired adjustable relationship to the leg 28 for providing a stop action by the foot section 38 abutting on or contacting the floorboard 12 underneath the foot pedal. Such section 38 can be suitably angled to be complementary to the floorboard 12, if desired.

From the foregoing, it will be seen that the governor device 24 of the invention can be made from any suitable material, usually metal bars or plates and the like and it can be easily secured to any existing vehicle structure for engaging the foot pedal thereof. The adjustments for the governor device can be easily made by a person when installing the device on a specific vehicle or at any time thereafter to find the operative length and position for the foot section of control member 36 to provide the desired governor or speed control action by regulating the amount of fuel to be supplied to the vehicle engine. This device is relatively inexpensive to make and is easily installed for effective service action. The components of the device remain engaged for ready adjustment. Thus, it is believed that the objects of the invention have been achieved.

While one complete embodiment of the invention has been disclosed herein, it will be appreciated that modifications of this particular embodiment of the invention may be resorted to without departing from the scope of the invention.

What is claimed is:

1. A governor or similar speed control device for a vehicle having a gas feed control foot pedal and comprising a frame means for engagement with a food pedal, a clamp means to secure said frame means to a foot pedal, an adjustable length control member depending from said frame means a variable distance to limit depression of the foot pedal, said frame means has a dependent leg having a longitudinally directed slot therein, said control member has a longitudinally directed slot therein, a lock means extends through said slots which are aligned when said control member and said leg are superimposed to secure them together but to enable adjustment of their relative axial positions, and means on said dependent leg and control member align them longitudinally and retain them in slidable adjustable length engagement.

2. A governor as in claim 1 where said frame means includes a U-shaped section for engaging an edge portion of a foot pedal, said U-shaped section including a fixedly positioned angle that has a flange extending in under the foot pedal, and said clamp means includes a set screw threadably engaging said flange of said U-section but protruding therefrom to bear on a surface of said foot pedal.

3. A governor as in claim 1 where said last named means on said dependent leg and control member include overhanging opposed edge flanges to engage said leg and control member.

* * * * *